(12) United States Patent
Chung et al.

(10) Patent No.: US 12,445,933 B2
(45) Date of Patent: Oct. 14, 2025

(54) APPARATUS AND METHOD FOR MULTI-LINK-BASED WIRELESS COMMUNICATION

(71) Applicant: SAMSUNG ELECTRONICS CO., LTD., Suwon-si (KR)

(72) Inventors: Chulho Chung, Yongin-si (KR); Jonghun Han, Gwacheon-si (KR); Myeongjin Kim, Seongnam-si (KR); Eunsung Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 443 days.

(21) Appl. No.: 18/051,752

(22) Filed: Nov. 1, 2022

(65) Prior Publication Data

US 2023/0141814 A1    May 11, 2023

(30) Foreign Application Priority Data

Nov. 5, 2021   (KR) ................... 10-2021-0151663

(51) Int. Cl.
*H04W 40/12*   (2009.01)
*H04W 24/08*   (2009.01)
*H04W 84/12*   (2009.01)

(52) U.S. Cl.
CPC .......... *H04W 40/12* (2013.01); *H04W 24/08* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,715,442 B2 | 5/2010 | Trainin et al. | |
| 10,581,496 B2 | 3/2020 | Cordeiro et al. | |
| 2018/0310340 A1 | 10/2018 | Noh et al. | |
| 2021/0068184 A1* | 3/2021 | Chu ............... | H04W 80/08 |
| 2021/0076398 A1* | 3/2021 | Naribole .......... | H04W 74/0816 |
| 2021/0195578 A1 | 6/2021 | Huang et al. | |
| 2021/0212045 A1 | 7/2021 | Cherian et al. | |

(Continued)

FOREIGN PATENT DOCUMENTS

| | | |
|---|---|---|
| KR | 10-2020-0130185 | 11/2020 |
| KR | 10-2021-0091661 | 7/2021 |
| WO | 2021091231 | 5/2021 |

OTHER PUBLICATIONS

Extended European Search Report dated Feb. 24, 2023 in corresponding European Patent Application No. 22205033.8 (9 pages).

(Continued)

*Primary Examiner* — Brian S Roberts
(74) *Attorney, Agent, or Firm* — Morgan, Lewis & Bockius LLP

(57) ABSTRACT

A wireless communication method performed by a first apparatus may include obtaining back-off counts of a plurality of links, when a back-off count of a first link among the plurality of links is zero, selecting a first or a second transmission method; when the first transmission method is selected, transmitting first data to a second apparatus over the first link, and when the second transmission method is selected, delaying transmission of the first data to the second apparatus until a back-off count of a second link among the plurality of links becomes zero.

18 Claims, 15 Drawing Sheets

(56) References Cited

U.S. PATENT DOCUMENTS

| | | |
|---|---|---|
| 2021/0212118 A1* | 7/2021 | Lu .................... H04W 74/0816 |
| 2021/0227502 A1 | 7/2021 | Huang et al. |
| 2021/0227529 A1 | 7/2021 | Chu et al. |
| 2021/0251006 A1* | 8/2021 | Cariou ............. H04W 74/0816 |
| 2021/0282186 A1 | 9/2021 | Cherian et al. |
| 2022/0225406 A1 | 7/2022 | Kim et al. |
| 2022/0394756 A1 | 12/2022 | Jang et al. |
| 2022/0394759 A1* | 12/2022 | Jang .................... H04W 74/04 |
| 2023/0054755 A1* | 2/2023 | Patil .................... H04W 76/15 |

OTHER PUBLICATIONS

IEEE P802.11be™/D1.0, "Draft Standard for Information technology—Telecommunications and information exchange between systems Local and metropolitan area networks—Specific requirements", May 2021, 635 pages.

\* cited by examiner

FIG. 10

| Name | Measurement Type |
|---|---|
| Basic | 0 |
| Clear Channel Assessment (CCA) | 1 |
| Receive Power Indication (RPI) Histogram | 2 |
| Channel Load | 3 |
| Noise Histogram | 4 |
| Beacon | 5 |
| Frame | 6 |
| STA Statics | 7 |
| Location Configuration Information (LCI) | 8 |
| Transmit Stream/Category Measurement | 9 |
| Multicast Diagnostics | 10 |
| Location Civic | 11 |
| Location Identifier | 12 |
| Directional Channel Quality | 13 |
| Directional Measurement | 14 |
| Directional Statistics | 15 |
| Fine Timing Measurement Range | 16 |
| Reserved | 17-254 |
| Measurement Pause | 255 |

APPARATUS AND METHOD FOR MULTI-LINK-BASED WIRELESS COMMUNICATION

CROSS-REFERENCE TO RELATED APPLICATION

This application is based on and claims priority under 35 U.S.C. § 119 to Korean Patent Application No. 10-2021-0151663, filed on Nov. 5, 2021, in the Korean Intellectual Property Office, the disclosure of which is incorporated by reference herein in its entirety.

TECHNICAL FIELD

The inventive concept relates to wireless communication, and more particularly, to an apparatus and method for multi-link-based wireless communication.

DISCUSSION OF RELATED ART

Wireless local area network (WLAN) is a wireless communication technology that wirelessly connects an access point (AP) to one or more wireless devices. The AP may be typically connected to the Internet and acts as a gateway to allow allowing the connected wireless device(s) to also connect to the Internet. WLAN technology may be based on the Institute of Electrical and Electronics Engineers (IEEE) 802.11 standard, often referred to as WiFi. The 802.11 standard has evolved into 802.11b, 802.11a, 802.11g, 802.11n, 802.11ac, and 802.11ax, and may support a transmission rate of up to 1 Gbyte/s based on orthogonal frequency-division multiplexing (OFDM) technology.

In 802.11ac, data may be simultaneously transmitted to a plurality of users via a multi-user multi-input multi-output (MU-MIMO) scheme. In 802.11ax, referred to as high efficiency (HE), multiple access is implemented by dividing and providing available subcarriers to users by applying not only MU-MIMO but also orthogonal frequency-division multiple access (OFDMA) technology. In this manner, a WLAN system, to which 802.11ax is applied, may effectively support communication in dense regions and in localized outdoor spaces.

In 802.11be, referred to as extremely high throughput (EHT), support for a 6 GHz unlicensed frequency band, utilization of bandwidth of up to 320 MHz per channel, introduction of hybrid automatic repeat and request (HARQ), and support for up to 16×16 MIMO are implemented. In this manner, a next-generation WLAN system is expected to effectively support low latency and ultrahigh-speed transmission like new radio (NR), which is 5$^{th}$ generation (5G) technology.

Recent proposals for a next generation WiFi have introduced the concept of multi-link communication, in which a single wireless device communicating with an AP may achieve higher throughput by aggregating data transmitted/received over a plurality of links, each associated with a different frequency band such as the 2.4 GHz, 5 GHz and 6 GHz bands. However, challenges remain to achieve high data throughput, particularly in a noisy environment.

SUMMARY

Embodiments of the inventive concept provide an apparatus and method for a higher throughput in multi-link-based wireless communication.

According to an aspect of the inventive concept, a wireless communication method performed by a first apparatus may include obtaining back-off counts of a plurality of links, when a back-off count of a first link among the plurality of links is zero, selecting a first transmission method or a second transmission method, when the first transmission method is selected, immediately transmitting first data to a second apparatus over the first link, and when the second transmission method is selected, delaying transmission of the first data to the second apparatus until a back-off count of a second link among the plurality of links becomes zero.

According to an aspect of the inventive concept, a first apparatus configured to communicate with a second apparatus over a plurality of links may include a transceiver that provides functionality of stations respectively corresponding to the plurality of links, and processing circuitry configured to control the transceiver, wherein the processing circuitry may select one of a first transmission method and a second transmission method when a back-off count of a first link among the plurality of links is zero, transmit first data to the second apparatus over the first link via the transceiver when the first transmission method is selected, and delay transmission of the first data to the second apparatus until a back-off count of a second link among the plurality of links becomes zero when the second transmission is selected.

According to an aspect of the inventive concept, a non-transitory computer-readable medium may store instructions executable by at least one processor to perform the wireless communication method outlined above.

BRIEF DESCRIPTION OF THE DRAWINGS

Embodiments of the inventive concept will be more clearly understood from the following detailed description taken in conjunction with the accompanying drawings in which:

FIG. 10 is a diagram showing measurement types included in a measurement request, according to an example embodiment;

DETAILED DESCRIPTION OF EMBODIMENTS

Figure 1:
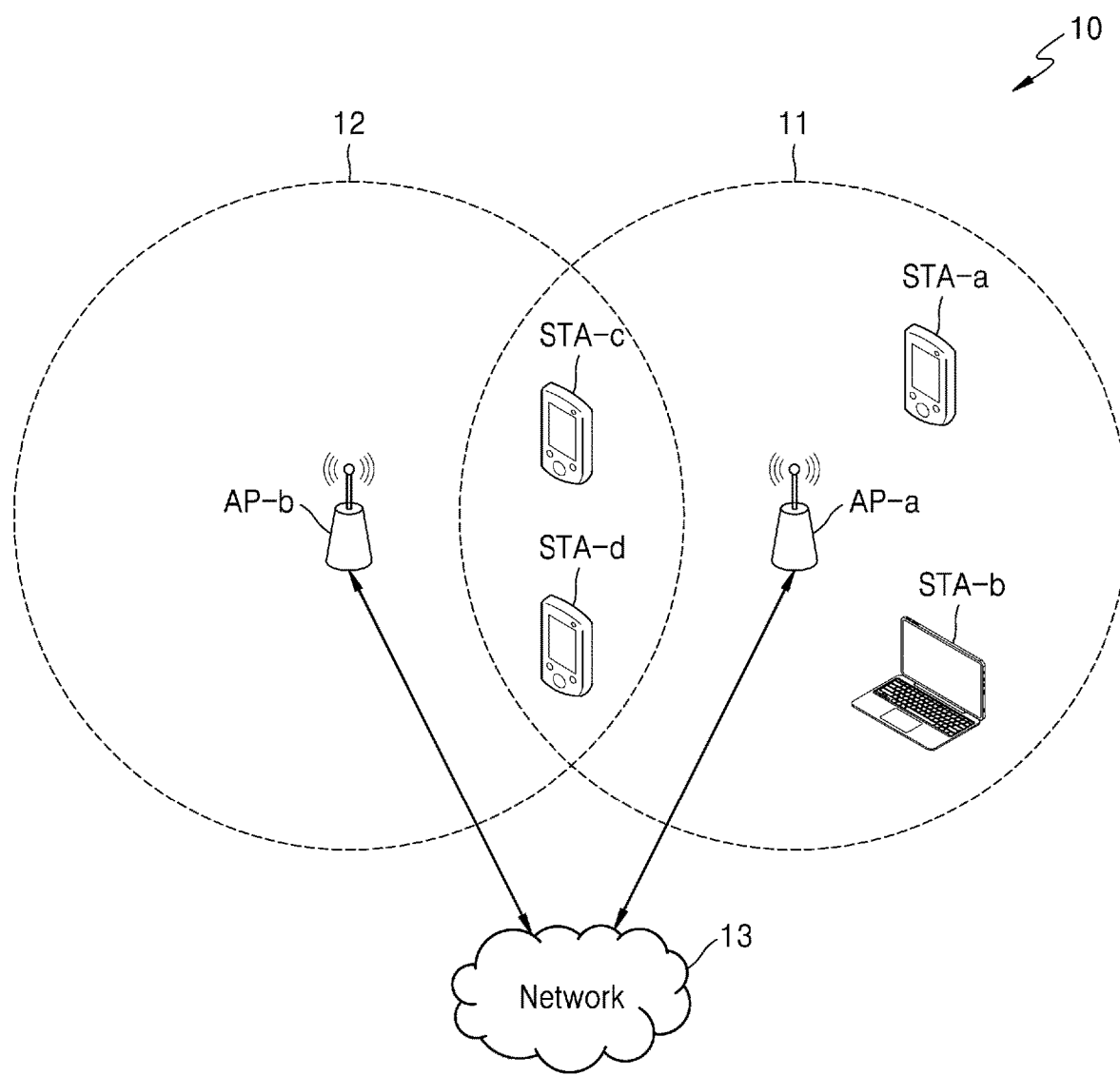
FIG. 1 is a diagram of a wireless communication system according to an example embodiment.

FIG. 1 is a diagram showing a wireless communication system 10 according to an example embodiment. Specifically, FIG. 1 shows a wireless local area network (WLAN) system as an example of the wireless communication system 10.

In specifically describing embodiments, an orthogonal frequency-division multiplexing (OFDM) or orthogonal frequency-division multiple access (OFDMA)-based wireless communication system, in particular, the Institute of Electrical and Electronic Engineers (IEEE) 802.11 standard, is the main object, but example embodiments are applicable to other communication systems (e.g., a cellular communication system such as long-term evolution (LTE), LTE-advanced (LTE-A), new radio (NR), wireless broadband (Wi-Bro), and global system for mobile communication (GSM), or a near-field communication system such as Bluetooth and near-field communication (NFC)) having a similar technical background and channel form with slight modifications not greatly departing from the scope of the inventive concept, which may be understood by those skilled in the art.

Referring to FIG. 1, the wireless communication system 10 may include a first access point AP-a, a second access point AP-b, a first station STA-a, a second station STA-b, a third station STA-c, and a fourth station STA-d. The first and second access points AP-a and AP-b may access a network 13 such as the Internet, an Internet protocol (IP) network, or other suitable network. The first access point AP-a may provide the first through fourth stations STA-a to STA-d with access to the network 13 within a first coverage region 11, and the second access point AP-b may also provide the third and fourth stations STA-c and STA-d with access to the network 13 within a second coverage region 12. The first and second access points AP-a and AP-b may communicate with at least one station among the first to fourth stations STA-a to STA-d, based on wireless fidelity (WiFi) or other WLAN access technology.

An access point may be referred to as a router, a gateway, and the like, and a station may be referred to as a mobile station, a subscriber station, a terminal, a mobile terminal, a wireless terminal, a user equipment, a user, and the like. The station may be a mobile apparatus such as a mobile phone, a laptop computer, or a wearable apparatus, or may be a stationary apparatus such as a desktop computer or a smart TV. Herein, the station may be referred to as a first apparatus, and the access point may be referred to as a second apparatus. Examples of the access point and the station may be described below with reference to FIG. 16.

The access point may allocate at least one resource unit (RU) to at least one station. The access point may transmit data via at least one allocated RU, and at least one station may receive the data via the at least one allocated RU. In 802.11ax (hereinafter, high efficiency (HE)), the access point may allocate only a single RU to at least one station, whereas in 802.11be (hereinafter, extremely high throughput (EHT)) or next-generation IEEE 802.11 standards (hereinafter, EHT+), the access point may allocate a multi-RU (MRU) including two or more RUs to at least one station. For example, the first access point AP-a may allocate an MRU to at least one of the first through fourth stations STA-a to STA-d and may transmit data via the allocated MRU.

The access point and the station may communicate with each other based on a multi-link. For example, as described below with reference to FIG. 3, an access point and a station may transmit or receive data over two or more links. Accordingly, the access point and the station may communicate data at a higher throughput than when only a single link is used. As described below with reference to FIGS. 5 and 6, in the case of links causing interference each other, aligning data transmissions in the time domain may be required in a related art example, but the aligning of the data transmissions may not necessarily guarantee a high throughput.

In embodiments described below, the access point or the station may adaptively determine whether to transmit data over a multi-link. For example, the access point or the station may adaptively determine, based on states of links, whether to transmit data over a single link or whether to transmit data over two or more links, and may select a transmission method that provides optimal throughput. Accordingly, a higher throughput may be achieved than when only a multi-link is used, and as a result, efficiency of the wireless communication system 10 may increase. Hereinafter, example embodiments will be described primarily with reference to EHT, but it will be understood that example embodiments may also be applied to other protocols, e.g., EHT+.

Figure 2:
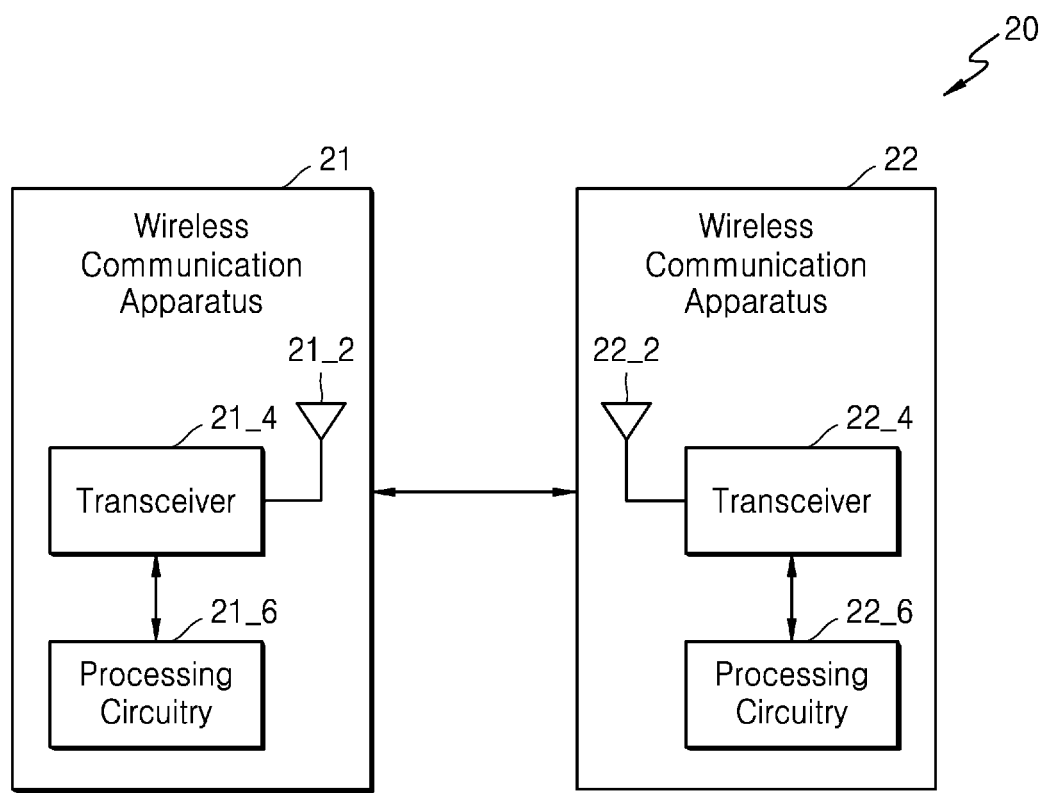
FIG. 2 is a block diagram showing a wireless communication system according to an example embodiment.

FIG. 2 is a block diagram showing a wireless communication system 20 according to an example embodiment. Here, the block diagram of FIG. 2 shows a first wireless communication apparatus 21 and a second wireless communication apparatus 22, which communicate with each other in the wireless communication system 20. Wireless communication system 20 may be an example of wireless communication system 10, where any of the wireless communication apparatuses in FIG. 1 may include the same or similar components of the first wireless communication apparatus 21 or the second wireless communication apparatus 22. Each of the first wireless communication apparatus 21 and the second wireless communication apparatus 22 of FIG. 2 may be any apparatus that communicates in the wireless communication system 20, and may be referred to as an apparatus for wireless communication or simply an apparatus. Each of the first wireless communication apparatus 21 and the second wireless communication apparatus 22 may be an access point (e.g., any of AP-a and AP-b) or a station (e.g., any of STA-a to STA-d) of a WLAN system.

Referring to FIG. 2, the first wireless communication apparatus 21 may include an antenna 21_2, a transceiver 21_4, and a processing circuitry 21_6. In some embodiments, the antenna 21_2, the transceiver 21_4, and the processing circuitry 21_6 may be included in one package, or may be included in different packages, respectively. The second wireless communication apparatus 22 may also include, an antenna 22_2, a transceiver 22_4, and a processing circuitry 22_6. Hereinafter, repeated descriptions of the first wireless communication apparatus 21 and the second wireless communication apparatus 22 will be omitted.

The antenna 21_2 may receive a signal from the second wireless communication apparatus 22 and provide the signal to the transceiver 21_4, and may transmit a signal provided from the transceiver 21_4 to the second wireless communication apparatus 22. In some embodiments, the antenna 21_2 may include a plurality of antennas for multiple input multiple output (MIMO). Also, in some embodiments, the antenna 21_2 may include a phased array for beamforming.

The transceiver 21_4 may process a signal received from the second wireless communication apparatus 22 via the antenna 21_2, and may provide the processed signal to the processing circuitry 21_6. Also, the transceiver 21_4 may process a signal provided from the processing circuitry 21_6, and may output the processed signal via the antenna 21_2. In some embodiments, the transceiver 21_4 may include an analog circuitry, such as a low noise amplifier, a mixer, a filter, a power amplifier, and an oscillator. In some embodiments, the transceiver 21_4 may process, based on the control by the processing circuitry 21_6, a signal received from the antenna 21_2 and/or a signal received from the processing circuitry 21_6.

The processing circuitry 21_6 may extract information transmitted by the second wireless communication apparatus 22 by processing a signal received from the transceiver 21_4. For example, the processing circuitry 21_6 may extract information by demodulating and/or decoding a signal received from the transceiver 21_4. Also, the processing circuitry 21_6 may generate a signal including information to be transmitted to the second wireless communication apparatus 22, and provide the signal to the transceiver 21_4. For example, the processing circuitry 21_6 may provide the transceiver 21_4 with a signal generated by encoding and modulating data to be transmitted to the second wireless communication apparatus 22. In some embodiments, the processing circuitry 21_6 may include a programmable component such as a central processing unit (CPU) and a digital signal processor (DSP), may include a reconfigurable component such as a field programmable gate array (FPGA), and may include a component that provides a fixed function such as an intellectual property (IP) core. In some embodiments, the processing circuitry 21_6 may include a memory storing data and/or a series of instructions, or may access the memory.

Herein, the transceiver 21_4 and/or the processing circuitry 21_6 performing operations may be simply referred to as the first wireless communication apparatus 21 performing the operations. Accordingly, operations performed by an access point may be performed by a transceiver and/or a processing circuitry included in the access point, and operations performed by a station may be performed by a transceiver and/or a processing circuitry included in the station.

Figure 3:
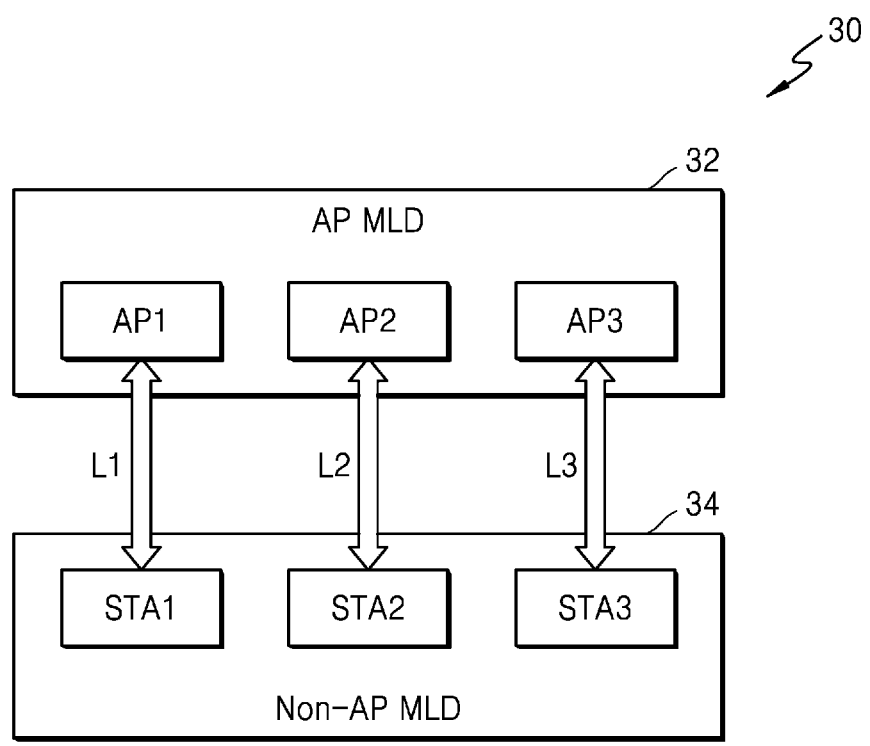
FIG. 3 is a block diagram showing a wireless communication system according to an example embodiment.

FIG. 3 is a block diagram showing a wireless communication system 30 according to an example embodiment. Here, the block diagram of FIG. 3 shows multi-link devices (MLDs) that communicate with each other based on a multi-link in the wireless communication system 30. Wireless communication system 30 may be an example of wireless communication system 10, where any of the additional wireless communications apparatus in FIG. 1 may also have multi-link functionality as described below.

Apparatuses for wireless communication may communicate with each other over two or more links. As shown in FIG. 3, an AP MLD 32 may be an example of either access point AP-a or AP-b, and a non-AP MLD 34 may be an example of any of the stations STA1 to STA4 of FIG. 1. The AP MLD 32 may include first to third "logical access points" AP1 to AP3, and the non-AP MLD 34 may include first to third "logical stations" STA1 to STA3. Any of the logical Aps AP1 to AP3 may include the same communication functionality as a stand-alone AP but may have transceiver/ processing resources for communicating over only one frequency band among a plurality of frequency bands, e.g., 2.4 GHz, 5 GHz or 6 GHz bands, that may be used for the multi-link communication. Similarly, any logical STA may include the same communication functionality as a stand-alone STA, but may likewise have transceiver/processing resources for communicating over only one of the frequency bands usable for the multi-link communication. Hereafter, the logical APs AP1 to AP3 may each be referred to simply as AP and the logical STAs STA1 to STA3 will be referred to simply as a station.

In other embodiments, the AP MLD 32 and the non-AP MLD 34 may communicate with each other over just two links (using two respective frequency bands), or over at least four links (using four respective frequency bands). In some embodiments, the transceiver 21_4 included in the first wireless communication apparatus 21 of FIG. 2 may provide the functionality for all of the first to third access points AP1 to AP3, and the processing circuitry 21_6 may control the first to third access points AP1 to AP3. Also, in some embodiments, the transceiver 22_4 included in the second wireless communication apparatus 22 of FIG. 2 may provide the functionality for all of the first to third stations STA1 to STA3, and the processing circuitry 22_6 may control the first to third stations STA1 to STA3.

The first to third access points AP1 to AP3 and the first to third stations STA1 to STA3 may set up first to third links L1 to L3, respectively. For example, the AP MLD 32 and the non-AP MLD 34 may perform an access procedure and/or a negotiation procedure for a multi-link operation (MLO). The non-AP MLD 34 may identify a band available for communication with the AP MLD 32, and may negotiate with the AP MLD 32 to use two or more links among links supported by the AP MLD 32 for a multi-link. A method of communication via two or more links as described above may be referred to as an MLO, and apparatuses that communicate with each other based on a multi-link may each be referred to as an MLD. Due to an MLO, the wireless communication system 30 may provide high throughput.

Figure 4:
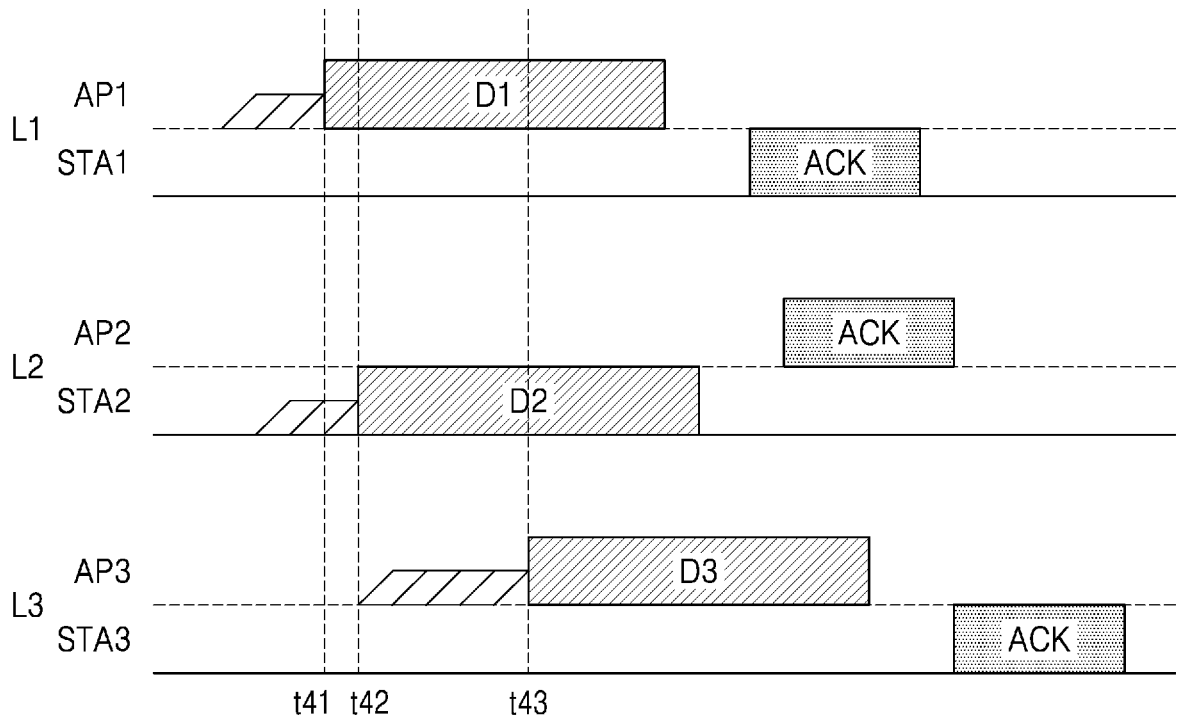
FIG. 4 is a timing diagram showing an example of a multi-link operation, according to an example embodiment.

FIG. 4 is a timing diagram showing an example of an MLO, according to an example embodiment. Specifically, the timing diagram of FIG. 4 shows an example of an MLO performed by the wireless communication system 30 of FIG. 3. Hereinafter, FIG. 4 will be described with reference to FIG. 3.

The AP MLD 32 and the non-AP MLD 34 of FIG. 3 may support simultaneous transmit and receive (STR). For example, the AP MLD 32 may transmit data to the non-AP MLD 34 over the first link L1 and simultaneously receive data from the non-AP MLD 34 over the second link L2. In some embodiments, the first to third access points AP1 to AP3 may have different medium access control (MAC) addresses, and may respectively be in charge of the first to third links L1 to L3. Accordingly, each of the first to third access points AP1 to AP3 may function as an independent access point. Also, the first to third stations STA1 to STA3 may have different MAC addresses, and each of the first to third stations STA1 to STA3 may function as an independent station. The AP MLD 32 and the non-AP MLD 34 may communicate with each other in a multi-band. For example, the first link L1 may use a bandwidth (e.g., 40 MHz) in a band of 2.4 GHz, the second link L2 may use a bandwidth (e.g., 160 MHz) in a 5 GHz band, and the third link L3 may use a bandwidth (e.g., 160 MHz) in a 6 GHz band.

Referring to FIG. 4, at time t41, the first access point AP1 may initiate transmission of first data D1 over the first link L1, and the first station STA1 may receive the first data D1.

While the first access point AP1 transmits the first data D1, at time t42, the second station STA2 may initiate transmission of second data D2 over the second link L2, and the second access point AP2 may receive the second data D2. Although the transmission of the first data D1 and the transmission of the second data D2 overlap in the time domain, due to STR, the first station STA1 and the second access point AP2 may normally receive the first data D1 and the second data D2, respectively. Also, while the first access point AP1 transmits the first data D1 and the second station STA2 transmits the second data D2, at time t43, the third access point AP3 may initiate transmission of third data D3 over the third link L3, and the third station STA3 may receive the third data D3. Although the transmission of the first data D1, the transmission of the second data D2, and the transmission of the third data D3 overlap in the time domain, due to STR, the first station STA1, the second access point AP2, and the third station STA3 may normally receive the first data D1, the second data D2, and the third data D3, respectively.

Figure 5:
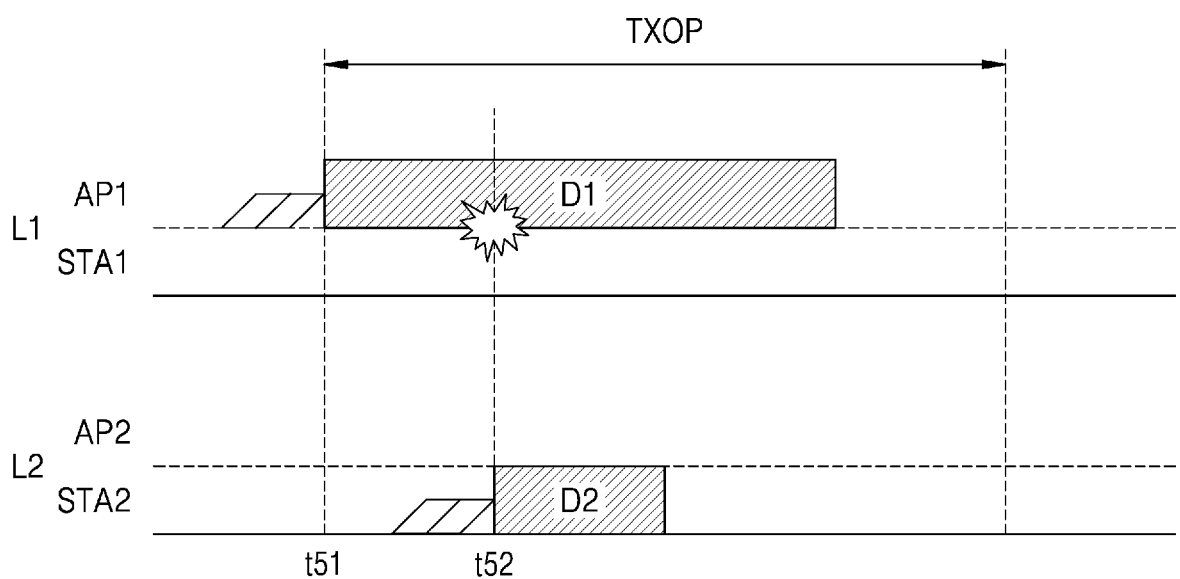
FIG. 5 is a timing diagram showing an example of a multi-link operation.

FIG. 5 is a timing diagram showing an example of an MLO, according to an example embodiment. Specifically, the timing diagram of FIG. 5 shows an example of non-STR (NSTR) in an MLO. Hereinafter, FIG. 5 will be described with reference to FIG. 3.

In an MLO, there may be links that do not support STR. For example, when bands of links are not sufficiently apart from each other in a frequency domain, interference between the links may occur, and accordingly, the links may not support STR. Also, when there is interference between links due to various causes (e.g., RF signal power leakage) within an MLD (e.g., a non-AP MLD), the links may not support STR. As such, links of an MLO may include links that do not support STR, that is, an NSTR link group, and in particular, two links that do not support STR due to interference in the NSTR link group may be referred to as an NSTR link pair. The NSTR link group may be mutually identified in a process of the AP MLD 32 and the non-AP MLD 34 setting up a multi-link.

Referring to FIG. 5, the first link L1 and the second link L2 are assumed to be an NSTR link pair. For example, the first link L1 may use a 6 GHz band, and the second link L2 may use a 5 GHz band. At time t51, the first access point AP1 may obtain Transmit Opportunity (TXOP) and initiate transmission of the first data D1 over the first link L1, and the first station STA1 may receive the first data D1. TXOP is a MAC-layer feature used in the IEEE 802.11 protocol, which defines a time duration for which a station can send frames after it has won contention for a transmission medium. At time t52, the second station STA2 may initiate transmission of the second data D2 over the second link L2, but when the first link L1 and the second link L2 are an NSTR link pair, interference between the transmission of the second data D2 and the reception of the first data D1 may occur. Accordingly, the second access point AP2 may not normally receive the second data D2, and the first station STA1 may not normally receive the first data D1. To prevent such interference, while transmission over the first link L1 is performed, transmission over the second link L2 may be suspended. However, in some cases according to embodiments herein, transmissions of data may simultaneously occur even in the NSTR link pair, an example of which will be described below with reference to FIG. 6. Hereinafter, the first link L1 and the second link L2 of FIG. 3 are assumed to be an NSTR link pair.

Figure 6:
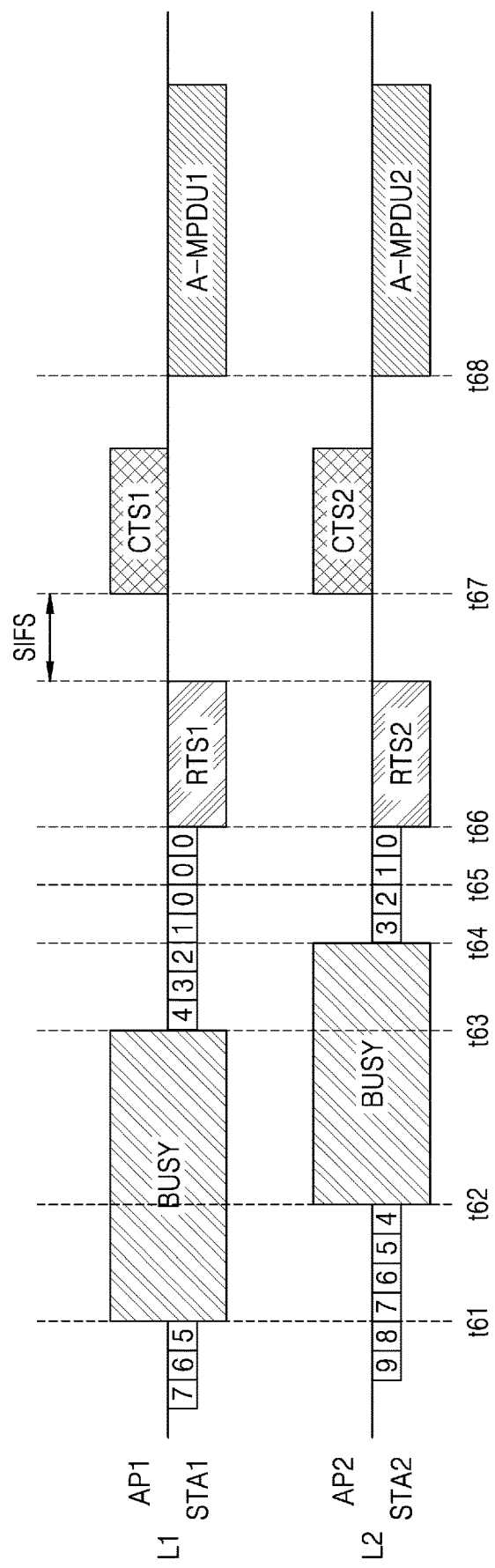
FIG. 6 is a timing diagram showing an example of a multi-link operation.

FIG. 6 is a timing diagram showing an example of an MLO. Here, the timing diagram of FIG. 6 shows an example in which transmissions of data simultaneously occur in the first link L1 and the second link L2, which are the NSTR link pair.

In some embodiments, a back-off count may be a count in a back-off procedure in which a plurality of stations, e.g., single link stations or logical stations such as STA1 and STA2 within a multi-link device, contend to gain access to a link. For example, each contending station may initiate a random back-off count prior to a transmission attempt to gain access to the link. When the back-off count reaches zero, the transmission attempt may be made. Referring to FIG. 6, while a channel of the first link L1 is not in a busy state (where "busy state" may refer to the link being in use by the AP with another station) a back-off count of the first station STA1 corresponding to the first link L1 may decrease, and while a channel of the second link L2 is not in a busy state, a back-off count of the second station STA2 corresponding to the second link L2 may decrease. At time t61, the channel of the first link L1 may enter the busy state due to other transmissions, and the back-off count of the first station STA1 may stop decreasing. Similarly, at time t62, the channel of the second link L2 may enter the busy state due to other transmissions, and the back-off count of the second station STA2 may stop decreasing.

At time t63, the busy state in the channel of the first link L1 may be released, and accordingly, the back-off count of the first station STA1 may gradually decrease from 4. Similarly, at time t64, the busy state in the channel of the second link L2 may be released, and accordingly, the back-off count of the second station STA2 may gradually decrease from 3.

At time t65, the back-off count of the first station STA1 may become zero, and accordingly, the first station STA1 may enter a state in which communication may be performed over the first link L1. However, as described above with reference to FIG. 5, when transmission is initiated over the first link L1 and then reception is performed over the second link L2, interference may occur. Accordingly, the first station STA1 may delay transmission until the back-off count of link L2 is zero, despite obtaining a channel access opportunity, so that a failure does not occur in clear channel assessment (CCA) for identifying whether the channel of the second link L2 is in a busy state.

At time t66, the back-off count of the second station STA2 may become zero, and accordingly, the second station STA2 may enter a state in which communication may be performed over the second link L2. Accordingly, the first station STA1 and the second station STA2 may simultaneously initiate transmission. For example, as shown in FIG. 6, at the time t66, the first station STA1 and the second station STA2 may simultaneously transmit a first request to send (RTS) frame RTS1 and a second RTS frame RTS2 to the first access point AP1 and the second access point AP2, respectively. Accordingly, the first link L1 may be reserved for the first station STA1, and the second link L2 may be reserved for the second station STA2. As such, an operation of simultaneously performing transmission over two links of the NSTR link pair by delaying transmission over one link may be referred to as a start time sync protocol data unit (PPDU) (physical layer protocol data unit or physical layer convergence procedure (PLCP) protocol data unit).

After the transmission of the first RTS frame RTS1 and the second RTS frame RTS2 is completed, a short inter-frame space (SIFS) elapses, and then at time t67, the first access point AP1 may transmit a first clear to send (CTS) frame CTS1 in response to the first RTS frame RTS1, and the second access point AP2 may transmit a second CTS frame CTS2 in response to the second RTS frame RTS2. Afterwards, at time t68, the first station STA1 may transmit a first aggregated-MAC protocol data unit (A-MPDU) A-MDPU1 to the first access point AP1, and the second station STA2 may transmit a second A-MPDU A-MPDU2 to the second access point AP2. As a result, data (i.e., A-MPDU1 and A-MPDU2) may be simultaneously transmitted over the first link L1 and the second link L2. However, a start time sync PPDU that aligns transmissions over the first link L1 and the second link L2 in the time domain may not always provide optimal performance (e.g., throughput), examples of which will be described below with reference to FIGS. 7A and 7B.

Figure 7A:
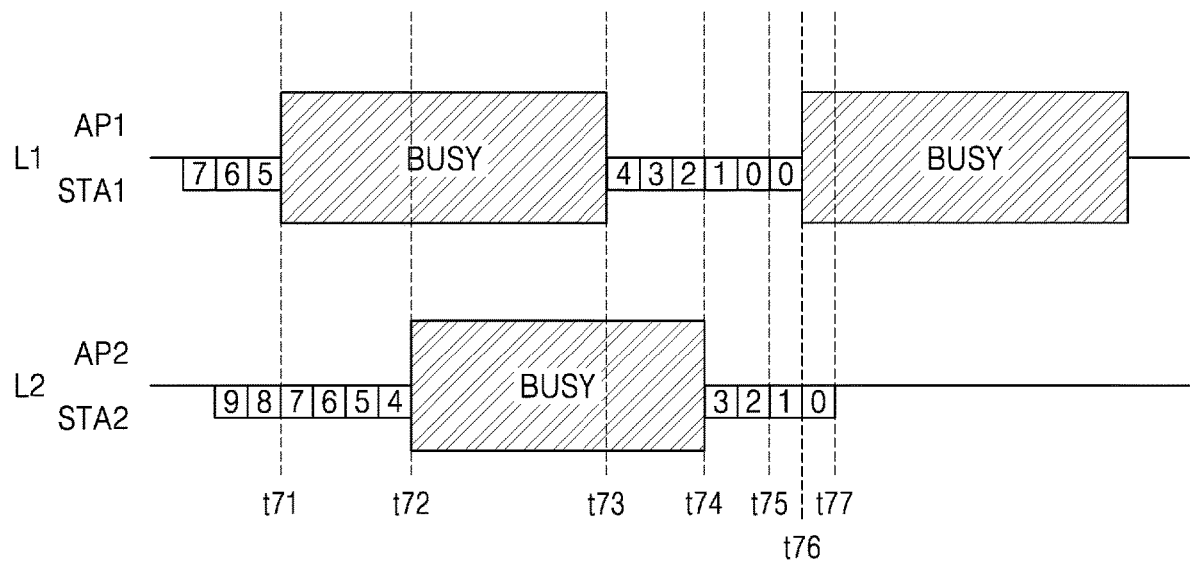
FIGS. 7A and 7B are timing diagrams showing examples of a multi-link operation, according to example embodiments.
Figure 7B:
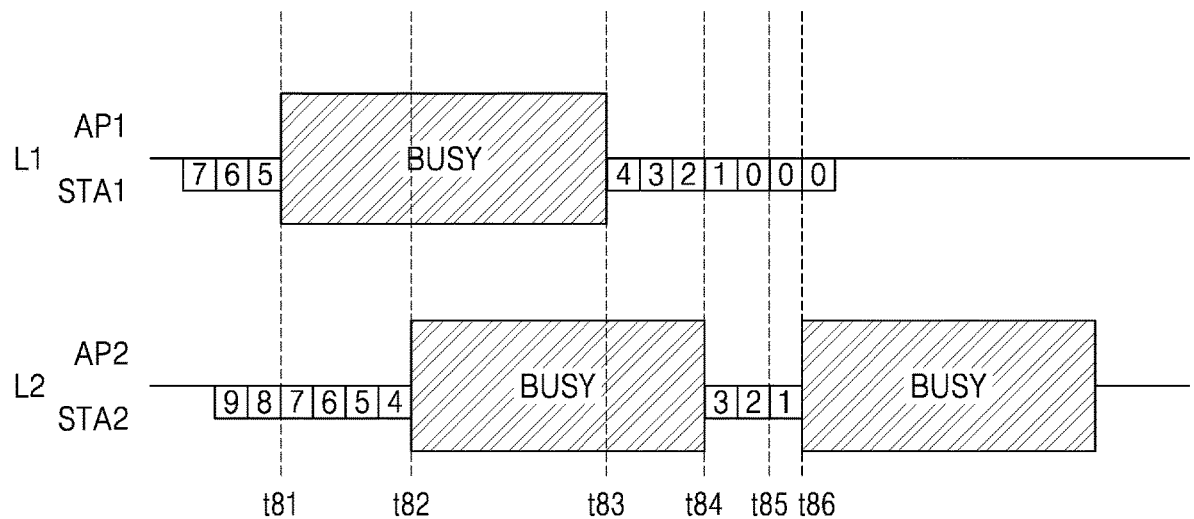

FIGS. 7A and 7B are timing diagrams showing examples of an MLO, according to example embodiments. Specifically, the timing diagrams of FIGS. 7A and 7B respectively show examples that may occur in a start time sync PPDU. Hereinafter, repeated descriptions of FIG. 6 in descriptions of FIGS. 7A and 7B will be omitted.

Referring to FIG. 7A, a channel of the first link L1 may be in a busy state from time t71 to time t73, and a channel of the second link L2 may be in a busy state from time t72 to time t74. The busy state of the channel in the first link L1 may be released at the time t73, and accordingly, a back-off count of the first station STA1 may gradually decrease. Similarly, the busy state of the channel in the second link L2 may be released at the time t74, and accordingly, a back-off count of the second station STA2 may gradually decrease.

At time t75, the back-off count of the first station STA1 has reached zero, but the back-off count of the second station STA2 is not yet zero, and thus transmission over the first link L1 may be delayed based on the start time sync PPDU. At time t76, before the back-off count of the second station STA2 becomes zero, the channel of the first link L1 may enter a busy state. Accordingly, although the back-off count of the second station STA2 has reached zero at time t77, transmissions over the first link L1 and the second link L2 may not be simultaneously performed, and the first station STA1 may lose an obtained channel access opportunity. However, unlike the case of FIG. 7A, in embodiments described below, the first station STA1 may initiate transmission at a time point at which the back-off count of the first station STA1 reaches zero, that is, at the time t75. This may result in higher throughput and a technique that always utilizing the start time sync PPDU.

Referring to FIG. 7B, a channel of the first link L1 may be in a busy state from time t81 to time t83, and a channel of the second link L2 may be in a busy state from time t82 to time t84. The busy state of the channel in the first link L1 may be released at the time t83, and accordingly, a back-off count of the first station STA1 may gradually decrease. Similarly, the busy state of the channel in the second link L2 may be released at the time t84, and accordingly, a back-off count of the second station STA2 may gradually decrease.

At time t85, the back-off count of the first station STA1 has reached zero, but the back-off count of the second station STA2 is not yet zero, and thus transmission over the first link L1 may be delayed based on the start time sync PPDU. At time t86, before the back-off count of the second station STA2 becomes zero, the channel of the second link L2 may enter a busy state. Accordingly, a period during which the first station STA1 delays transmission may be extended, and accordingly, transmissions over the first link L1 and the second link L2 may not be simultaneously performed. Also, when the channel of the first link L1 enters the busy state in the extended period as described above with reference to FIG. 7A, the first station STA1 may lose an obtained channel access opportunity. Unlike in FIG. 7B, the first station STA1 initiating transmission at a time point at which the back-off count of the first station STA1 reaches zero, that is, at the time t85, may be more efficient than the start time sync PPDU.

As described below, when a back-off count of a link reaches zero, an MLD may determine whether to perform a transmission method (herein, which may be referred to as a "first transmission method" or "first transmission") over at least one link for which a back-off count is zero, or whether to delay the first transmission method until a back-off count of the additional link reaches zero and perform a transmission (herein, which may be referred to as a "second transmission method" or "second transmission") over a plurality of links together with an additional link. The MLD may select a transmission method that provides optimal performance (e.g., throughput) among the first and second transmission methods, and accordingly, an efficiency of an MLO may be increased. Hereinafter, a non-AP MLD will be mainly described, but it will be understood that example embodiments may also be applied to an AP MLD.

Figure 8:
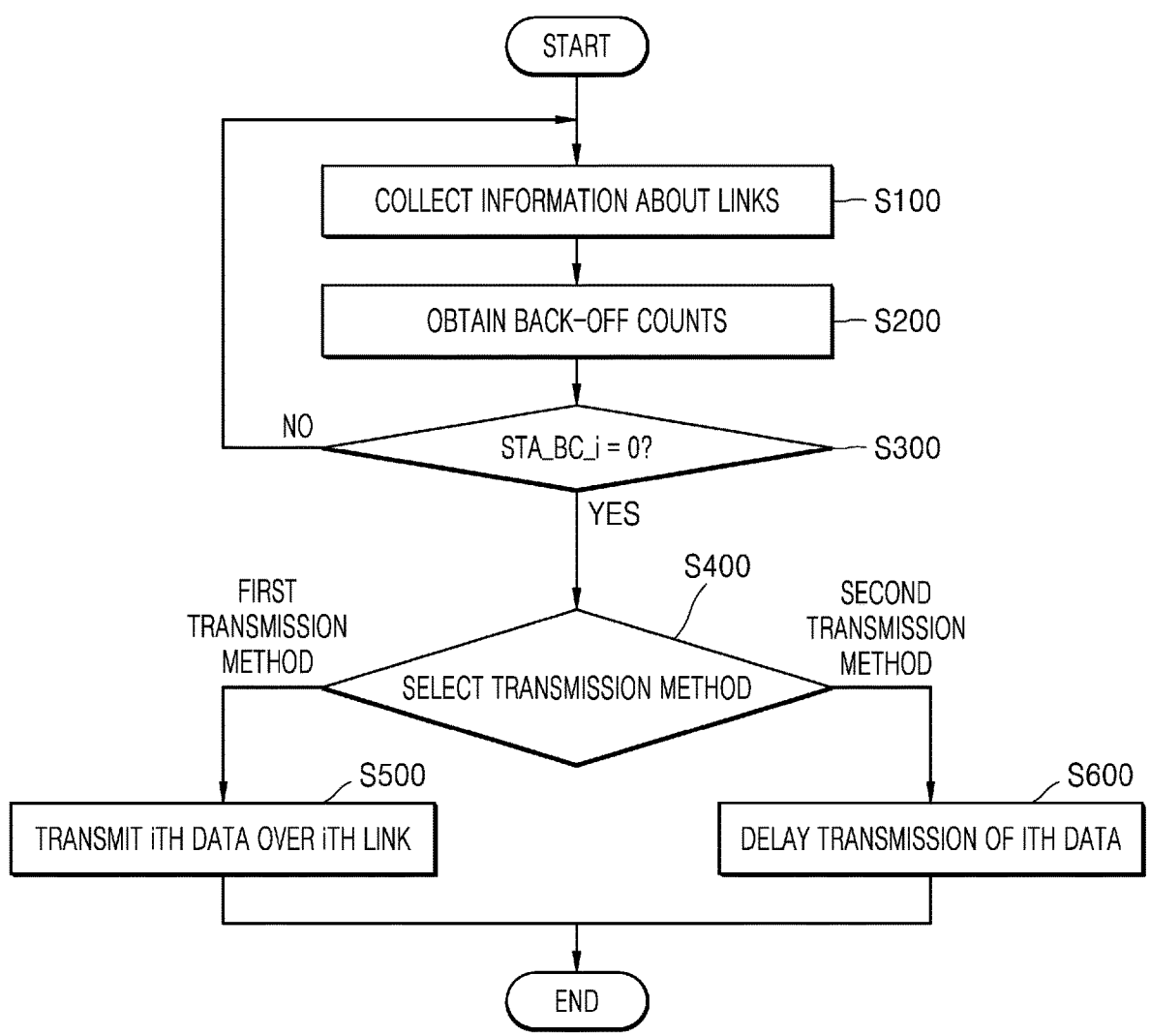
FIG. 8 is a flowchart showing a multi-link-based wireless communication method according to an example embodiment.

FIG. 8 is a flowchart showing a multi-link-based wireless communication method according to an example embodiment. As shown in FIG. 8, the multi-link-based wireless communication method may include a plurality of operations S100 to S600. In some embodiments, the method of FIG. 8 may be performed by the non-AP MLD 34 of FIG. 3. Hereinafter, FIG. 8 will be described with reference to FIG. 3, and the first link L1 and the second link L2 of FIG. 3 are assumed to be an NSTR link pair. It is noted here that in the flowchart of FIG. 8, as well as in the other flowcharts herein (FIGS. 9 and 11-14), the order of the illustrated operations may be changed as desired in other embodiments, and/or some of the operations may be performed in parallel.

Referring to FIG. 8, in operation S100, information about links may be collected. For example, the non-AP MLD 34 may collect information about the first link L1 and the second link L2, which are the NSTR link pair, and select an appropriate transmission method based on the collected information. An example of operation S100 will be described below with reference to FIG. 9.

In operation S200, back-off counts may be obtained. For example, the non-AP MLD 34 (e.g., a processing circuitry included in the non-AP MLD 34) may obtain a back-off count from the first station STA1 corresponding to the first link L1, and may obtain a back-off count from the second station STA2 corresponding to the second link L2.

In operation S300, a back-off count that has reached zero may be detected. For example, as shown in FIG. 8, when a back-off count STA_BC_i corresponding to an $i^{th}$ link among N links included in an NSTR link group reaches zero (STA_BC_i=0), operation S400 may be performed subsequently (N is an integer greater than 1, $1 \le i \le N$). On the other hand, when a back-off count that has reached zero is not detected, operation S100 and operation S200 may be performed again.

When the back-off count STA_BC_i corresponding to the $i^{th}$ link reaches zero, a transmission may be selected in operation S400. For example, when the back-off count of the first station STA1 reaches zero, the non-AP MLD 34 may select one of a transmission over the first link L1, that is, a first transmission method ("first transmission"), and a transmission over both the first link L1 and the second link L2, that is, a second transmission method ("second transmission"). As shown in FIG. 8, when the first transmission method is selected, operation S500 may be performed subsequently, whereas, when the second transmission method is selected, operation S600 may be performed subsequently.

The non-AP MLD 34 may select one of the first transmission method and the second transmission method based on the information collected in operation S100, and an example of operation S400 will be described below with reference to FIG. 11.

When the first transmission is selected, $i^{th}$ data may be immediately transmitted over the $i^{th}$ link in operation S500. For example, the non-AP MLD 34 may control the first station STA1 to transmit first data over the first link L1 without any intentional delay, i.e., irrespective of a back-off count associated with the second link L2. On the other hand, when the second transmission is selected, transmission of the $i^{th}$ data may be delayed in operation S600. For example, the non-AP MLD 34 may delay transmitting the first data over the first link L1 until the back-off count of the second station STA2 becomes zero. When the second transmission is selected and the back-off count of the second station STA2 reaches zero, the non-AP MLD 34 may control the first station STA1 and the second station STA2 to simultaneously transmit first data and second data over the first link L1 and the second link L2, respectively.

Figure 9:
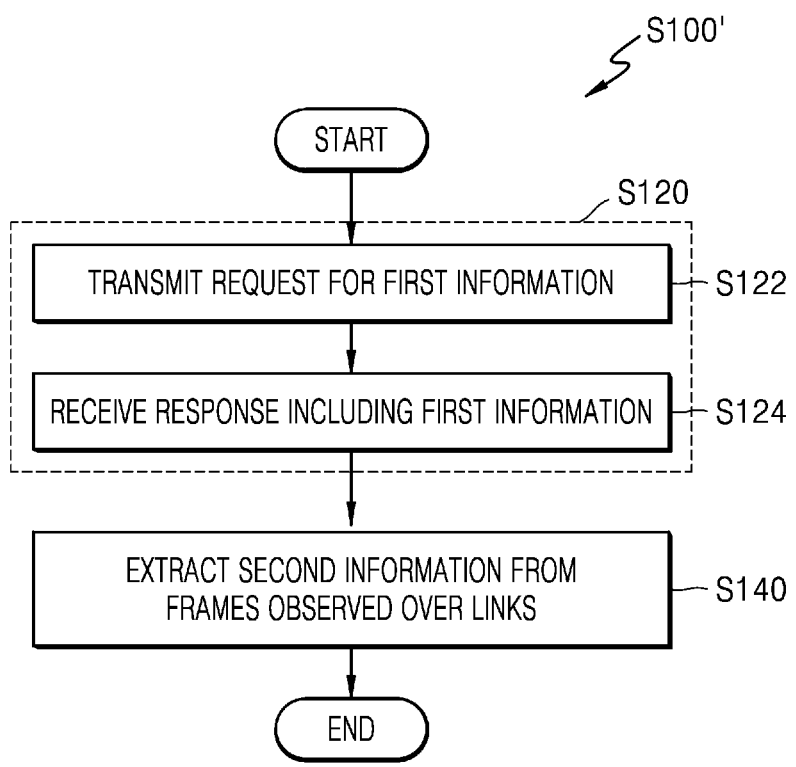
FIG. 9 is a flowchart showing a multi-link-based wireless communication method according to an example embodiment.

FIG. 9 is a flowchart showing a multi-link-based wireless communication method according to an example embodiment. Specifically, the flowchart of FIG. 9 shows an example of operation S100 of FIG. 8. As described above with reference to FIG. 8, information about links included in an NSTR link group may be collected in operation S100' of FIG. 9. As shown in FIG. 9, operation S100' may include operation S120 and operation S140, and operation S120 may include operation S122 and operation S124. In some embodiments, unlike in FIG. 9, operation S100 of FIG. 8 may include only one of operation S120 and operation S140 of FIG. 9. Hereinafter, FIG. 9 will be described with reference to FIG. 3.

"First information" may be collected based on a request and a response in operation S120. To this end, a request for the first information may be transmitted in operation S122, and a response including the first information may be received in operation S124. For example, the non-AP MLD 34 may transmit, to the AP MLD 32, a request for first information corresponding to each of links. The wireless communication system 30 may provide frames for requesting for a variety of information and responding between wireless communication apparatuses, and elements included in each of the frames. For example, as described below with reference to FIG. 10, the non-AP MLD 34 may transmit a spectrum measurement request frame to the AP MLD 32, as one example of the first information.

The AP MLD 32 may transmit, to the non-AP MLD 34, a response including the first information in response to the request from the non-AP MLD 34. For example, the AP MLD 32 may transmit a measurement report frame to the non-AP MLD 34. Also, in some embodiments, the AP MLD 32 may transmit a request for first information to the non-AP MLD 34, and the non-AP MLD 34 may transmit a response including the first information to the AP MLD 32. As such, the first information indicating states of links may be explicitly collected and may be used as a basis for selecting an optimal transmission. However, the first information is not limited to the examples described above, and may include any information about a link, which may be collected via a request and a response, in which the information is sufficient to make at least part of the determination regarding which transmission method to use.

Additionally, "second information" may be extracted from frames observed over links in operation S140. For example, the non-AP MLD 34 may extract second information by monitoring links. Frames observed over a link, for example, a frame received from the AP MLD 32 to the non-AP MLD 34 over a link, a frame transmitted by the AP MLD 32 or another non-AP MLD or a station over a link, and the like, may include information about the link, and accordingly, the non-AP MLD 34 may extract the second information from the frames observed over the links. For example, the non-AP MLD 34 may extract a basic service set (BSS) load element from a probe response frame or beacon frame, which is transmitted by the AP MLD 32, and identify utilization in the time domain and in a frequency domain of a corresponding link, based on the BSS load element. As such, the second information indicating states of links may be implicitly collected and may be used as a basis for selecting an optimal transmission. However, the second information is not limited to the examples described above, and may include any information about a link, which may be extracted from an observed frame.

FIG. 10 is a diagram showing measurement types included in a measurement request, according to an example embodiment. As described above with reference to FIG. 9, the first information used as a basis for selecting an optimal transmission may be collected based on a request and a response. A table presented in FIG. 10 is merely an example of the first information, and it is noted that the first information corresponding to any information collectable via a request and a response is not limited to FIG. 10. Hereinafter, FIG. 10 will be described with reference to FIG. 3.

The non-AP MLD 34 may transmit a measurement request frame to the AP MLD 32. As shown in FIG. 10, various measurements may be requested via measurement request frames. In some embodiments, the non-AP MLD 34 may transmit, to the AP MLD 32, a measurement request corresponding to one of measurement types shown in FIG. 10. The AP MLD 32 may transmit, to the non-AP MLD 34, a measurement report frame including a value corresponding to a measurement type, in response to the measurement request.

Figure 11:
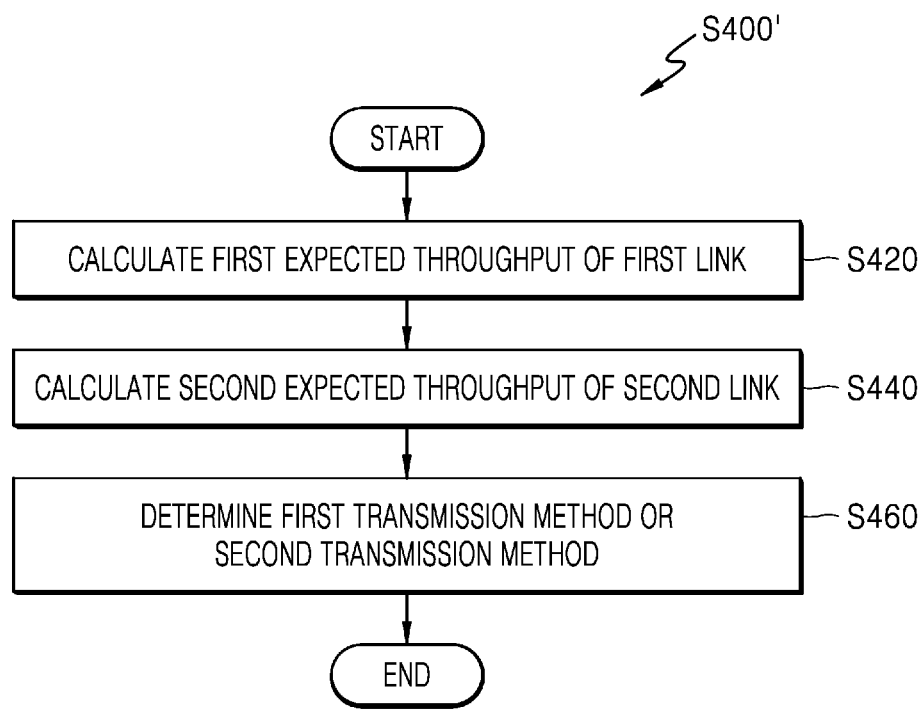
FIG. 11 is a flowchart showing a multi-link-based wireless communication method according to an example embodiment.

FIG. 11 is a flowchart showing a multi-link-based wireless communication method according to an example embodiment. Here, the flowchart of FIG. 11 shows an example of operation S400 of FIG. 8 involving selecting a transmission method. As described above with reference to FIG. 8, an optimal transmission method may be selected from the first and second transmission methods. As shown in FIG. 11, operation S400' may include a plurality of operations S420, S440, and S460. Operation S400' may be performed by the non-AP MLD 34 (or a processing circuitry included in the non-AP MLD 34) of FIG. 3. Hereinafter, FIG. 11 will be described with reference to FIG. 3, and the first link L1 and the second link L2 are assumed to be an NSTR link pair.

A first expected throughput of the first link L1 may be calculated in operation S420, and a second expected throughput of the second link L2 may be calculated in operation S440. To this end, an expected throughput may be calculated based on at least one of a bandwidth and a signal-to-noise ratio (SNR). For example, a first expected throughput $T_1$ and a second expected throughput $T_2$ may be calculated as in [Equation 1] below.

$$T_1 = f(BW_1, SNR_1, \ldots)$$

$$T_2 = f(BW_2, SNR_2, \ldots) \quad \text{[Equation 1]}$$

In [Equation 1], $BW_1$ is a bandwidth of the first link L1, $SNR_1$ is an SNR of the first link L1, $BW_2$ is a bandwidth of the second link L2, and $SNR_2$ is an SNR of the second link L2. Thus, an expected throughput may be defined as a function f of parameters including a bandwidth and an SNR.

In operation S460, the first transmission method or the second transmission method may be determined. For example, an optimal transmission method may be selected from the first and second transmission methods, based on the first and second expected throughputs in operations S420 and S440, respectively. Based on the first expected throughput and the second expected throughput, a gain using the first transmission method ("first gain") and a gain using the second transmission method ("second gain") may be derived, and a transmission method that provides a higher gain may be selected. Herein, the term "gain", as used in association with at least one link, may be understood as a collective (multi-link) throughput using the at least one link. "Gain" may also be understood in a relative sense as a gain in throughput of a multi-link communication as compared to a single link operation. An example of operation S460 will be described below with reference to FIG. 12.

Figure 12:
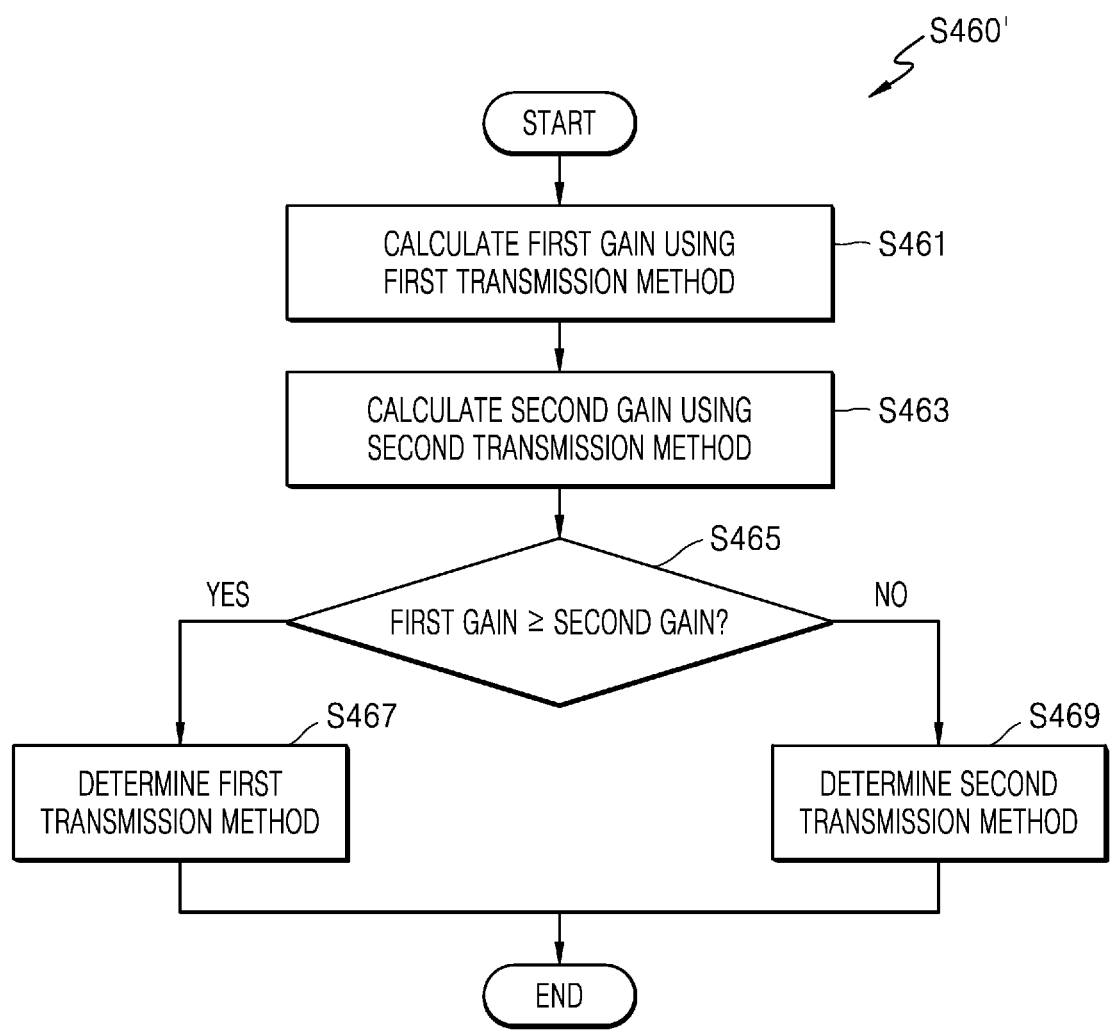
FIG. 12 is a flowchart showing a multi-link-based wireless communication method according to an example embodiment.

FIG. 12 is a flowchart showing a multi-link-based wireless communication method according to an example embodiment. The flowchart of FIG. 12 shows an example of operation S460 of FIG. 11. As described above with reference to FIG. 11, the first or second transmission methods may be determined in operation S460' of FIG. 12. As described in FIG. 12, operation S460' may include a plurality of operations S461, S463, S465, S467, and S469. In some embodiments, operation S460' may be performed by the non-AP MLD 34 (or a processing circuitry included in the non-AP MLD 34) of FIG. 3. Hereinafter, FIG. 12 will be described with reference to FIG. 3, and the first link L1 and the second link L2 are assumed to be an NSTR link pair.

Referring to FIG. 12, a first gain using the first transmission may be calculated in operation S461. For example, the non-AP MLD 34 may determine the first gain as the first expected throughput of the first link L1, which has been calculated in operation S420 of FIG. 11. That is, the first gain may correspond to a throughput expected when the first transmission method is performed.

In operation S463, a second gain using the second transmission method may be calculated. The second gain may correspond to a throughput expected when transmission is performed over the first link L1 and the second link L2, and may be calculated based on the first expected throughput of the first link L1 and the second expected throughput of the second link L2. An example of operation S463 will be described below with reference to FIG. 13.

In operation S465, the first gain and the second gain may be compared. As described above, the first gain may correspond to a throughput expected when the first transmission is performed, and the second gain may correspond to a throughput expected when the second transmission is performed. Accordingly, as shown in FIG. 12, when the first gain equals or exceeds the second gain, the first transmission method may be determined in operation S467, whereas, when the first gain is less than the second gain, the second transmission method may be determined in operation S469. When the first transmission method is used, transmission of data may be initiated earlier than when the second transmission method is used.

Figure 13:
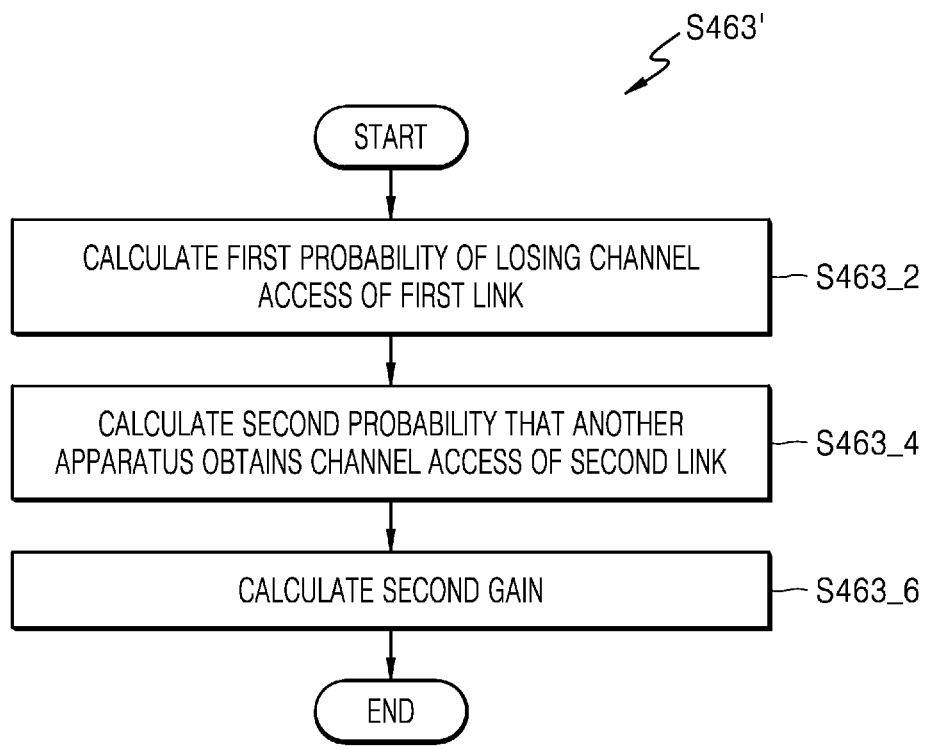
FIG. 13 is a flowchart showing a multi-link-based wireless communication method according to an example embodiment.

FIG. 13 is a flowchart showing a multi-link-based wireless communication method according to an example embodiment. Specifically, the flowchart of FIG. 13 shows an example of operation S463 of FIG. 12. As described above with reference to FIG. 12, the second gain of the second transmission may be calculated in operation S463' of FIG. 13. As shown in FIG. 13, operation S463' may include a plurality of operations S463_2, S463_4, and S463_6. In some embodiments, operation S463' may be performed by the non-AP MLD 34 (or a processing circuitry included in the non-AP MLD 34) of FIG. 3. Hereinafter, FIG. 13 will be described with reference to FIG. 3, and the first link L1 and the second link L2 are assumed to be an NSTR link pair.

Referring to FIG. 13, a first probability of losing channel access of the first link L1 may be calculated in operation S463_2. As described above with reference to FIG. 7A, the first station STA1 for which the back-off count has reached zero may stand by for the back-off count of the second station STA2 to reach zero for the start time sync PPDU. Accordingly, when the non-AP MLD 34 stands by for the back-off count of the second station STA2 to reach zero, the non-AP MLD 34 may calculate the first probability of losing channel access of the first link L1. In some embodiments, the non-AP MLD 34 may calculate the first probability based on, for example, a state of the first link L1, such as the number of other stations related to the first link L1 and a traffic amount related to the first link L1, and/or a current back-off count of the second station STA2. Accordingly, the first probability may increase as the number of other stations related to the first link L1 is large, a traffic amount related to the first link L1 is large, and a current back-off count of the second station STA2 increases.

In operation S463_4, a second probability that another device obtains channel access of the second link L2 may be calculated. As described above with reference to FIG. 7B, while the second station STA2 stands by for the back-off count of the second station STA2 to reach zero, the second station STA2 may lose channel access of the second link L2. Accordingly, the non-AP MLD 34 may calculate the second probability of losing the channel access of the second link L2 before the back-off count of the second link L2 reaches zero. In some embodiments, the non-AP MLD 34 may calculate the second probability based on, for example, a state of the second link L2, such as the number of other stations related to the second link L2 and a traffic amount related to the second link L2, and/or a current back-off count of the second station STA2. Accordingly, the second probability may increase as the number of other stations related to the second link L2 is large, a traffic amount related to the second link L2 is large, and a current back-off count of the second station STA2 increases.

In operation S463_6, the second gain may be calculated. In some embodiments, the second gain may be calculated based on the first expected throughput and the second expected throughput, which are respectively calculated in operation S420 and operation S440, the first probability calculated in operation S463_2, and the second probability calculated in operation S463_4. For example, a second gain $G_2$ may be calculated as in [Equation 2] below.

$$G_2 = p_1 \times f_2(BW_2, SNR_2, \ldots) + (1-p_1)(1-p_2) \times f_1(BW_1, SNR_1, \ldots) + (1-p_1)p_2 \times \{f_1(BW_1, SNR_1, \ldots) + f_2(BW_2, SNR_2, \ldots)\}$$ [Equation 2]

In [Equation 2], $p_1$ is a first probability, $p_2$ is a second probability, $f_1(BW_1, SNR_1, \ldots)$ is a first expected throughput, and $f_2(BW_2, SNR_2, \ldots)$ is a second expected throughput. Also, in [Equation 2], $(1-p_1)$ may indicate a probability of not losing channel access of the first link L1, and $(1-p_2)$ may indicate a probability that the second station STA2 obtains channel access, that is, a probability that a back-off count reaches zero without interruption. Accordingly, the second gain $G_2$ may correspond to a throughput expected when the second transmission is performed.

Figure 14:
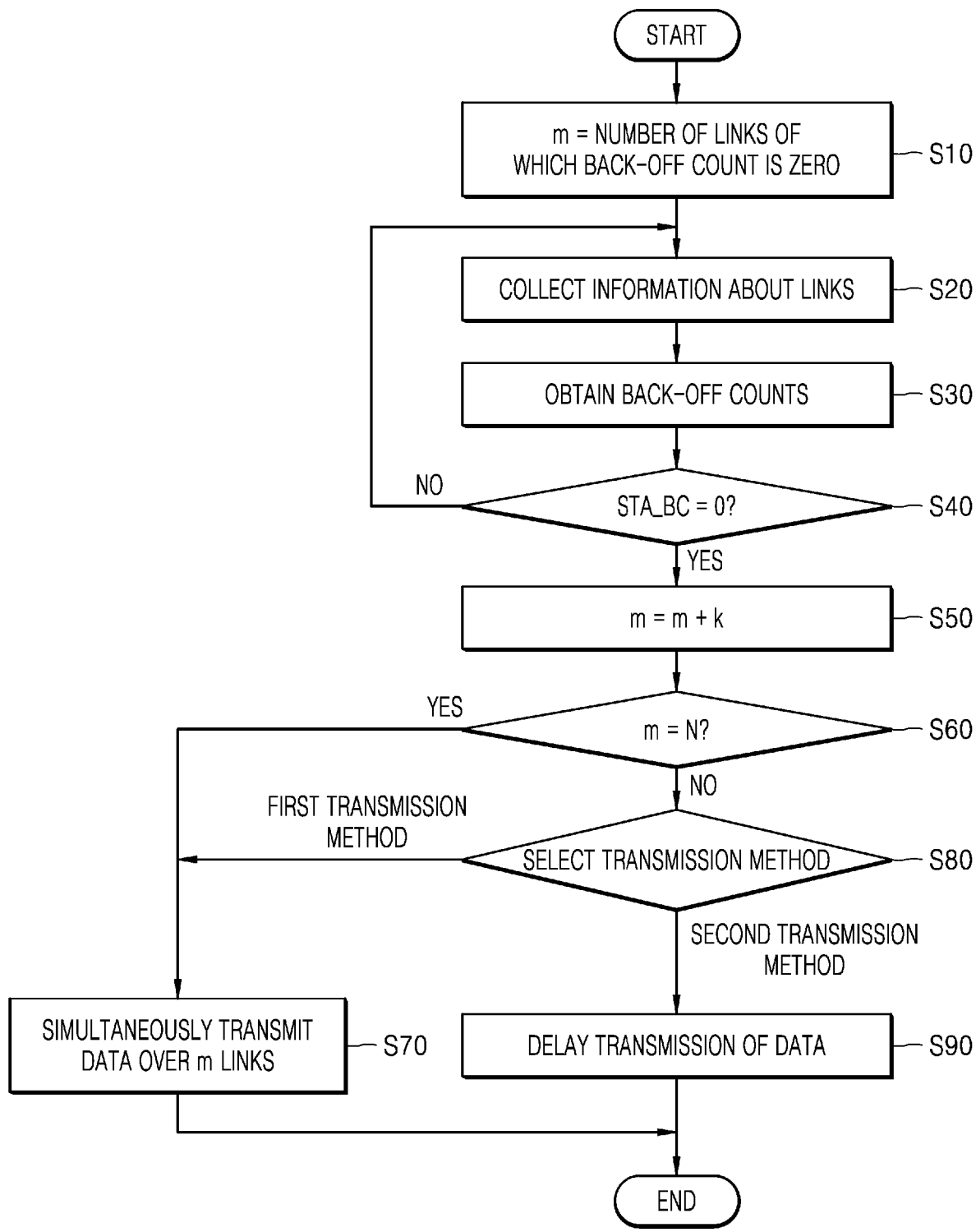
FIG. 14 is a flowchart showing a multi-link-based wireless communication method according to an example embodiment.

FIG. 14 is a flowchart showing a multi-link-based wireless communication method according to an example embodiment. Specifically, FIG. 14 shows a wireless communication method performed when an NSTR link group includes N links in a multi-link (N is an integer greater than 2). As shown in FIG. 14, the multi-link-based wireless communication method may include a plurality of operations S10 to S90. In some embodiments, the method of FIG. 14 may be performed by the non-AP MLD 34 of FIG. 3. Hereinafter, FIG. 14 will be described with reference to FIG. 3, and it is assumed that the first to third links L1 to L3 of FIG. 3 are included in the NSTR link group.

Referring to FIG. 14, in operation S10, the number of links for which a back-off count is zero may be identified. For example, a variable m may be set to the number of links for which a back-off count reaches zero until before operation S30 is performed (m is an integer of 0 or more).

In operation S20, information about links may be collected. For example, the non-AP MLD 34 may explicitly collect first information and/or implicitly collect second information, as information about the first to third links L1 to L3. The collected information may be used as a basis for selecting an optimal transmission.

In operation S30, back-off counts may be obtained. For example, the non-AP MLD 34 (for example, a processing circuitry included in the non-AP MLD 34) may obtain back-off counts from the first to third stations STA1 to STA3 respectively corresponding to the first to third links L1 to L3.

In operation S40, k back-off counts that have reached zero may be detected (k is an integer greater than 0). One back-off count may reach zero, or two or more back-off counts may simultaneously reach zero. As shown in FIG. 14, when a back-off count that has reached zero is not detected, operation S10 and operation S20 may be performed again, whereas, when k back-off counts that have reached zero are detected, operation S40 may be performed subsequently.

In operation S50, links for which a back-off count has reached zero may be accumulated. As shown in FIG. 14, k may be added to the variable m, and accordingly, the variable m may correspond to the number of links for which a current back-off count has reached zero.

In operation S60, whether back-off counts have reached zero in all links of the NSTR link group may be determined. For example, as shown in FIG. 14, the variable m may be compared to N, and when the variable m is the same as N, that is, when back-off counts have reached zero in all links of the NSTR link group, operation S70 may be performed subsequently. On the other hand, when the variable m is not the same as N, that is, when a back-off count has not reached zero in at least one link included in the NSTR link group, operation S80 may be performed subsequently.

When the variable m is not the same as N, a transmission may be selected in operation S80. For example, when the back-off count of the first station STA1 reaches zero, the non-AP MLD 34 may select one of a transmission over the first link L1, that is, a first transmission, and a transmission over the first link L1 and the second link L2 or over the first link L1 and the third link L3, that is, a second transmission. Also, when the back-off counts of the first station STA1 and the second station STA2 are both zero, the non-AP MLD 34 may select one of a transmission over the first link L1 and the second link L2, that is, a first transmission, and a transmission over all of the first to third links L1 to L3, that is, a second transmission.

In some embodiments, the non-AP MLD 34 may consider only a link having the lowest back-off count among links for which a back-off count has not reached zero. For example, in a case where the back-off count of the first link L1 has reached zero, when the back-off count of the second station STA2 is less than the back-off count of the third station STA3, the non-AP MLD 34 may consider only a transmission over the first link L1 and the second link L2 among possible second transmissions. As shown in FIG. 14, when the first transmission is selected, operation S70 may be performed subsequently, whereas, when the second transmission is selected, operation S90 may be performed subsequently.

When back-off counts reach zero in all links of the NSTR link group or the first transmission is selected, data may be simultaneously transmitted over m links in operation S70. That is, without standing by for a back-off count to reach zero in an additional link, data may be transmitted over m links for which a current back-off count is zero.

When the second transmission is selected, transmission of data may be delayed in operation S90. For example, the non-AP MLD 34 may delay transmission of data until channel access is obtained in a link corresponding to a back-off count that has not yet reached zero. In one example, when the second transmission is selected, the back-off count of the first link and the back-off count of the third link are zero, and the back-off count of the second link has not reached zero, the transmission of the first data, the transmission of the second data, and the transmission of the third data may be delayed until the back-off count of the second link is zero. In some embodiments, as described above with reference to FIG. 8, when a back-off count of a remaining link in the NSTR link pair reaches zero, data transmission may be performed over both links of the NSTR link pair, whereas, when the second transmission is selected while a back-off count does not reach zero in two or more links, the method of FIG. 14 may be repeatedly performed. That is, subsequent to operation S90, operation S10 may be performed.

Figure 15:
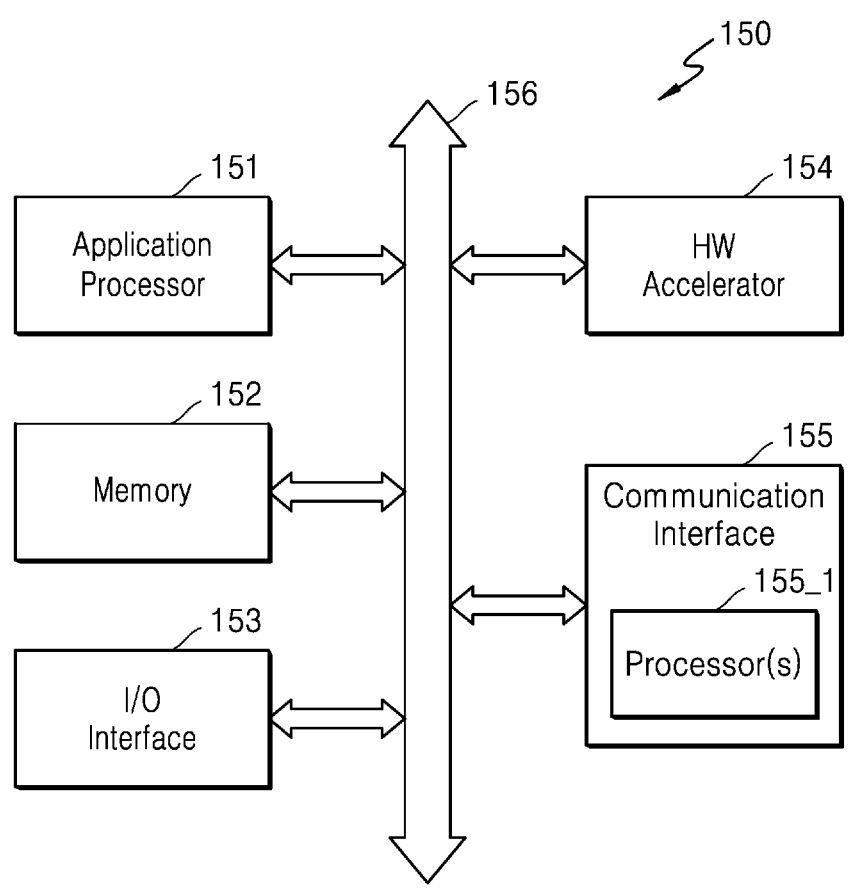
FIG. 15 is a block diagram showing a system according to an example embodiment.

FIG. 15 is a block diagram showing a system 150 according to an example embodiment. In some embodiments, the system 150 of FIG. 15 may be implemented as at least one chip, and the system 150 implemented as one chip may be referred to as a system-on-chip. As shown in FIG. 15, the system 150 may include an application processor 151, a memory 152, an input/output (I/O) interface 153, a hardware (HW) accelerator 154, and a communication interface 155, and the application processor 151, the memory 152, the I/O interface 153, the HW accelerator 154, and the communication interface 155 may communicate with each other via a bus 156.

The application processor 151 may control the system 150. For example, the application processor 151 may include at least one core, and each of the at least one core may execute a series of instructions stored in the memory 152. In some embodiments, the application processor 151 may execute an operating system (OS), and may execute applications on the OS. The application processor 151 may control other components of the system 150. For example, the application processor 151 may instruct the HW accelerator 154 to perform an operation by providing data to the HW accelerator 154, and may obtain a result of the operation performed by the HW accelerator 154. Also, the application processor 151 may instruct transmission by providing the communication interface 155 with data to be transmitted to the outside, and may obtain data received from the outside via the communication interface 155.

The memory 152 may be accessed by other components via the bus 156. The memory 152 may have any structure capable of storing data, and may include, for example, a volatile memory such as static RAM (SRAM) and dynamic RAM (DRAM), and/or a non-volatile memory such as flash memory and resistive RAM (RRAM). The memory 152 may store instructions executed by the application processor 151, and may store data read or written by other components.

The I/O interface 153 may provide an interface for input to the system 150 and output from the system 150. For example, the I/O interface 153 may communicate with an I/O device included in a product together with the system 150, and may receive a user input or provide an output to a user via the I/O device. Also, the I/O interface 153 may communicate with peripherals included in a product together with the system 150, and may enable the application processor 151 to control the peripherals.

The HW accelerator 154 may be hardware designed to perform a function at a high speed. For example, the HW accelerator 154 may be designed to perform encoding and decoding of data at a high speed. Also, the HW accelerator 154 may be designed to perform neural processing at a high speed. The HW accelerator 154 may process data stored in the memory 152, and may store the processed data in the memory 152.

The communication interface 155 may provide a communication channel to an object external to the system 150. For example, the communication interface 155 may provide a wired communication channel and/or a wireless communication channel. In some embodiments, the communication interface 155 may perform at least one operation included in the multi-link-based wireless communication method described above with reference to the FIGS. 1-14. For example, as shown in FIG. 15, the communication interface 155 may include at least one processor 155_1, and the at least one processor 155_1 may execute instructions to perform at least one operation included in the multi-link-based wireless communication method described above with reference to FIGS. 1-14. In some embodiments, the at least one processor 155_1 may execute instructions stored in the memory 152 or a memory included in the communication interface 155. In some embodiments, the memory 152 or the memory included in the communication interface 155 may store information about links collected, and may be accessed by the at least one processor 155_1.

Figure 16:
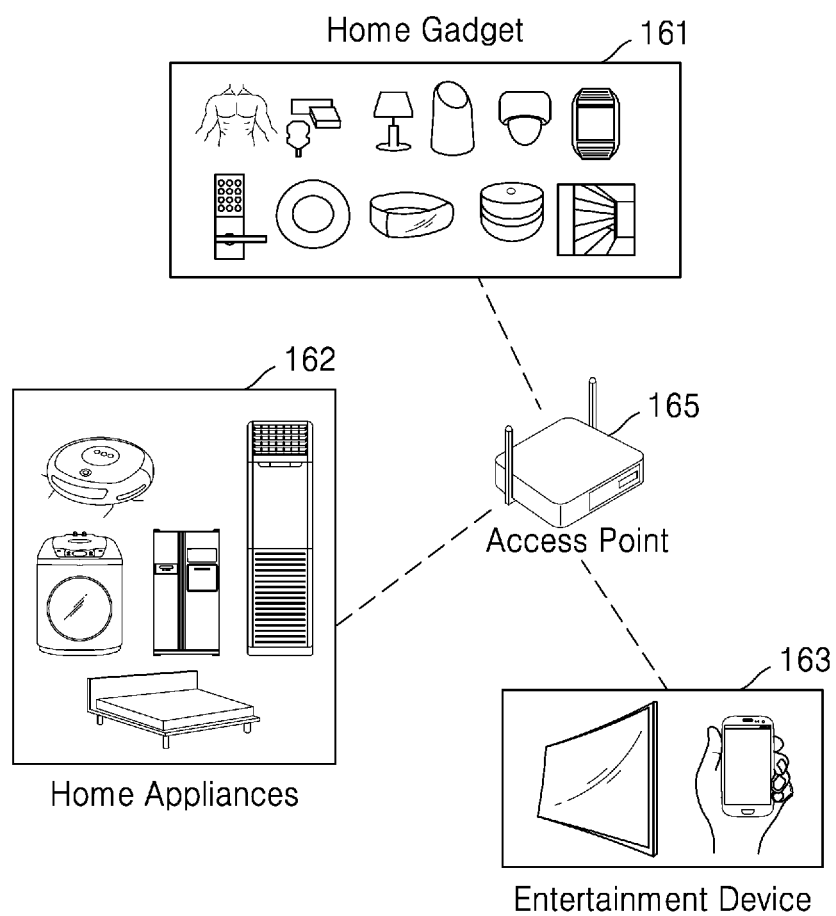
FIG. 16 is a diagram showing examples of an apparatus for wireless communication, according to an example embodiment.

FIG. 16 is a diagram showing examples of an apparatus for wireless communication, according to an example embodiment. Specifically, FIG. 16 shows an Internet of Things (IoT) network system including a home gadget 161, home appliances 162, an entertainment device 163, and an access point (AP) 165.

In some embodiments, in apparatuses for wireless communication of FIG. 16, as described above with reference to FIGS. 1-15, an MLO may be supported. For instance, the AP 165 may be an example of the AP MLD 32 of FIG. 3, and any one of the home gadget 161, home appliances 162, and entertainment device 163 may be an example of the non-AP MLD 34 of FIG. 3. Accordingly, apparatuses for wireless communication may explicitly and/or implicitly collect information about links, and may select an optimal transmission based on the collected information. Accordingly, throughput may increase, and an efficiency of an WLAN system may increase.

Various functions described hereinabove may be implemented or supported by artificial intelligence technology or one or more computer programs, and each of the programs includes computer-readable program code and is implemented in a computer-readable medium. The terms "application" and "program" refer to one or more computer programs, software components, sets of instructions, procedures, functions, objects, classes, instances, related data, or portions thereof adapted for implementing appropriate computer-readable program code. The term "computer-readable program code" includes any type of computer code including source code, object code, and executable code. The term "computer-readable medium" includes any type of medium that may be accessed by a computer, such as read-only memory (ROM), random-access memory (RAM), a hard disk drive, a compact disc (CD), a digital video disc (DVD), or any other type of memory. "Non-transitory" computer-readable media exclude wired, wireless, optical, or other communication links that transmit transitory electrical or other signals. The non-transitory computer-readable media include media where data may be permanently stored and media where data may be stored and later overwritten, such as rewritable optical discs or erasable memory devices.

In various embodiments described hereinabove, a hardware approach is described as an example. However, various embodiments include technology using both hardware and software, and thus various embodiments do not exclude a software-based approach.

Also, terms that refer to control information, terms that refer to entries, terms that refer to network entities, terms that refer to messages, and terms that refer to components of apparatuses, which are described above, are examples for convenience of description. Other terms having equal technical meanings may be substituted.

While the inventive concept has been particularly shown and described with reference to embodiments thereof, it will be understood that various changes in form and details may be made therein without departing from the spirit and scope of the following claims.

What is claimed is:

1. A wireless communication method performed by a first apparatus, the method comprising:
    collecting information about at least one of a first expected throughput of a first link or a second expected throughput of a second link;
    obtaining back-off counts of a plurality of links;
    when a back-off count of the first link among the plurality of links is zero, selecting one of a first transmission method and a second transmission method based on the collected information;
    when the first transmission method is selected, immediately transmitting first data to a second apparatus over the first link; and
    when the second transmission method is selected, delaying transmission of the first data to the second apparatus until a back-off count of the second link among the plurality of links becomes zero.

2. The method of claim 1, wherein the collecting of the information comprises:
    transmitting a request for first information to the second apparatus; and
    receiving a response including the first information from the second apparatus.

3. The method of claim 1, wherein the collecting of the information comprises extracting second information from frames observed over the first link and the second link.

4. The method of claim 1, wherein the selecting of the one of the first transmission method and the second transmission method comprises:
    calculating a first expected throughput of the first link;
    calculating a second expected throughput of the second link; and determining the first transmission method or the second transmission method based on the first expected throughput and the second expected throughput.

5. The method of claim 4, wherein the calculating of the first expected throughput comprises calculating the first expected throughput based on at least one of a bandwidth and a signal-to-noise ratio of the first link, and
the calculating of the second expected throughput comprises calculating the second expected throughput based on at least one of a bandwidth and a signal-to-noise ratio of the second link.

6. The method of claim 4, wherein the determining of the first transmission method or the second transmission method comprises:
calculating a first gain using the first transmission method based on the first expected throughput;
calculating a second gain using the second transmission method based on the first expected throughput and the second expected throughput; and
comparing the first gain and the second gain with each other.

7. The method of claim 6, wherein the calculating of the second gain comprises:
calculating a first probability of losing channel access of the first link before the back-off count of the second link becomes zero;
calculating a second probability that another apparatus obtains channel access of the second link before the back-off count of the second link becomes zero; and
calculating the second gain based on the first expected throughput, the second expected throughput, the first probability, and the second probability.

8. The method of claim 1, further comprising, when the second transmission method is selected and the back-off count of the second link is zero, simultaneously transmitting, to the second apparatus, the first data and second data over the first link and the second link.

9. The method of claim 1, wherein the first link and the second link are included in a non-simultaneous transmit and receive (NSTR) link group among the plurality of links.

10. The method of claim 9, wherein the second link has a lowest back-off count among links included in the NSTR link group when the back-off count of the first link is zero.

11. The method of claim 9, further comprising:
when the first transmission method is selected, simultaneously transmitting, to the second apparatus, the first data and third data over the first link and a third link for which back-off counts are zero among the plurality of links, respectively; and
when the second transmission method is selected, delaying transmission of the third data to the second apparatus.

12. A first apparatus configured to communicate with a second apparatus over a plurality of links, the first apparatus comprising:
a transceiver configured to provide functionality of stations respectively corresponding to the plurality of links; and
a processing circuitry configured to control the transceiver,
wherein the processing circuitry is configured to,
when a back-off count of a first link among the plurality of links is zero, select one of a first transmission method and a second transmission method,
when the first transmission method is selected, transmit first data to the second apparatus over the first link via the transceiver, and when the second transmission method is selected, delay transmission of the first data to the second apparatus until a back-off count of a second link among the plurality of links becomes zero,
wherein the processing circuitry is further configured to:
collect information about at least one of a first expected throughput of the first link or the second expected throughput of the second link, and
select the one of the first transmission method and the second transmission method based on the collected information.

13. The first apparatus of claim 12, wherein the processing circuitry is further configured to:
calculate a first expected throughput of the first link,
calculate a second expected throughput of the second link, and
select the one of the first transmission method and the second transmission method based on the first expected throughput and the second expected throughput.

14. The first apparatus of claim 13, wherein the processing circuitry is further configured to:
calculate a first gain using the first transmission method based on the first expected throughput,
calculate a second gain using the second transmission method based on the first expected throughput and the second expected throughput, and
compare the first gain and the second gain with each other.

15. The first apparatus of claim 14, wherein the processing circuitry is further configured to
calculate a first probability of losing channel access of the first link before the back-off count of the second link becomes zero,
calculate a second probability that another apparatus obtains channel access of the second link before the back-off count of the second link becomes zero, and
calculate the second gain based on the first expected throughput, the second expected throughput, the first probability, and the second probability.

16. The first apparatus of claim 12, wherein the processing circuitry is further configured to, when the second transmission method is selected and the back-off count of the second link is zero, simultaneously transmit, to the second apparatus, the first data over the first link and second data over the second link via the transceiver.

17. The first apparatus of claim 12, wherein the first link and the second link are included in a non-simultaneous transmit and receive (NSTR) link group among the plurality of links.

18. A non-transitory computer-readable medium configured to store instructions executable by at least one processor to perform a wireless communication method comprising:
collecting information about at least one of a first expected throughput of a first link or a second expected throughput of a second link
obtaining back-off counts of a plurality of links;
when a back-off count of the first link among the plurality of links is zero, selecting one of a first transmission method and a second transmission method;
when the first transmission method is selected, triggering transmission of first data over the first link; and
when the second transmission method is selected, delaying transmission of the first data until a back-off count of the second link among the plurality of links becomes zero, wherein the selecting of the one of the first transmission method and the second transmission method is based on the collected information.

\* \* \* \* \*